United States Patent
Naegeli et al.

(10) Patent No.: US 6,757,522 B1
(45) Date of Patent: Jun. 29, 2004

(54) TECHNIQUE FOR DETERMINING CARRIER-TO-NOISE RATIO OF SELECTED CHANNELS IN AN ACCESS NETWORK

(75) Inventors: Charles Naegeli, Half Moon Bay, CA (US); Hungsan Chen, San Jose, CA (US); Nan Tu, San Jose, CA (US); Harihara Mahesh, San Jose, CA (US); Chrisanto de Jesus Leano, San Jose, CA (US); Nozar Azarakhsh, Modesto, CA (US)

(73) Assignee: Cisco Technology, Inc., San Jose, CA (US)

( * ) Notice: Subject to any disclaimer, the term of this patent is extended or adjusted under 35 U.S.C. 154(b) by 596 days.

(21) Appl. No.: 09/735,200

(22) Filed: Dec. 11, 2000

(51) Int. Cl.[7] .............................................. H04B 17/00
(52) U.S. Cl. .................... 455/67.11; 455/423; 725/107
(58) Field of Search .............................. 455/423, 424, 455/67.11, 67.13; 725/107, 109–125

(56) References Cited

U.S. PATENT DOCUMENTS 5,862,451 A    1/1999   Grau et al.
6,147,786 A  * 11/2000  Pan .............................. 359/124

OTHER PUBLICATIONS

AD9071, Product Specification, Analog Devices, Inc., 1999, 12 Pages, One Technology Way, Norwood, MA 02062, http://www.analog.com.

* cited by examiner

Primary Examiner—Lee Nguyen
(74) Attorney, Agent, or Firm—Beyer Weaver & Thomas LLP

(57) ABSTRACT

A technique is disclosed for determining a carrier-to-noise ratio (CNR) value for a selected channel of an access network. A background noise level on the selected channel is measured during a first time interval during which none of the network nodes are transmitting signals on the selected channel. A first signal strength on the selected channel is also measured during a second time interval during which a first network node is transmitting at least one signal on the selected channel. A CNR value for the selected channel may then be calculated using the measured background noise level information and the measured first signal strength information. According to a specific implementation, the calculation of the CNR value for the selected channel is not based upon an Error Vector Magnitude value associated with the signal transmitted from the first network node.

37 Claims, 8 Drawing Sheets

US 6,757,522 B1

TECHNIQUE FOR DETERMINING CARRIER-TO-NOISE RATIO OF SELECTED CHANNELS IN AN ACCESS NETWORK

BACKGROUND OF THE INVENTION

1. Field of the Invention

The present invention relates generally to data networks, and more specifically to a technique for determining the signal-to-noise ratio value on one or more channels of an access network.

2. Background

Broadband access technologies such as cable, fiber optic, and wireless have made rapid progress in recent years. Recently there has been a convergence of voice and data networks which is due in part to US deregulation of the telecommunications industry. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable high-quality voice/video communication over such networks is not an easy task.

One type of broadband access technology relates to cable modem networks. A cable modem network or "cable plant" employs cable modems, which are an improvement of conventional PC data modems and provide high speed connectivity. Cable modems are therefore instrumental in transforming the cable system into a full service provider of video, voice and data telecommunications services. Digital data on upstream and downstream channels of the cable network is carried over radio frequency ("RF") carrier signals. Cable modems convert digital data to a modulated RF signal for upstream transmission and convert downstream RF signal to digital form. The conversion is done at a subscriber's facility. At a Cable Modem Termination System ("CMTS"), located at a Head End of the cable network, the conversions are reversed. The CMTS converts downstream digital data to a modulated RF signal, which is carried over the fiber and coaxial lines to the subscriber premises. The cable modem then demodulates the RF signal and feeds the digital data to a computer. On the return path, the digital data is fed to the cable modem (from an associated PC for example), which converts it to a modulated RF signal. Once the CMTS receives the upstream RF signal, it demodulates it and transmits the digital data to an external source.

FIG. 1 is a block diagram of a typical two-way hybrid fiber-coaxial (HFC) cable network system. It shows a Head End 102 (essentially a distribution hub) which can typically service about 40,000 homes. Head End 102 contains a CMTS 104 that is needed when transmitting and receiving data using cable modems. Primary functions of the CMTS include (1) receiving baseband data inputs from external sources 100 and converting the data for transmission over the cable plant (e.g., converting Ethernet or ATM baseband data to data suitable for transmission over the cable system); (2) providing appropriate Media Access Control (MAC) level packet headers for data received by the cable system, and (3) modulating and demodulating the data to and from the cable system.

Head End 102 connects through pairs of fiber optic lines 106 (one line for each direction) to a series of fiber nodes 108. Each Head End can support normally up to 80 fiber nodes. Pre-HFC cable systems used coaxial cables and conventional distribution nodes. Since a single coaxial cable was capable of transmitting data in both directions, one coaxial cable ran between the Head End and each distribution node. In addition, because cable modems were not used, the Head End of pre-HFC cable systems did not contain a CMTS. Returning to FIG. 1, each of the fiber nodes 108 is connected by a coaxial cable 110 to two-way amplifiers or duplex filters 112, which permit certain frequencies to go in one direction and other frequencies to go in the opposite direction (different frequency ranges are used for upstream and downstream paths). Each fiber node 108 can normally service up to 2000 subscribers. Fiber node 108, coaxial cable 110, two-way amplifiers 112, plus distribution amplifiers 114 along with trunk line 116, and subscriber taps, i.e. branch lines 118, make up the coaxial distribution system of an HFC system. Subscriber tap 118 is connected to a cable modem 120. Cable modem 120 is, in turn, connected to a network device 122, such as a subscriber computer.

In order for data to be able to be transmitted effectively over a wide area network such as HFC or other broadband computer networks, a common standard for data transmission is typically adopted by network providers. A commonly used and well known standard for transmission of data or other information over HFC networks is the Data Over Cable System Interface Specification (DOCSIS). The DOCSIS standard has been publicly presented by Cable Television Laboratories, Inc. (Louisville, Colo.), in a document entitled, DOCSIS 1.1 RF Interface Specification (document control number SP-RFIv1.1-I04-000407, Apr. 7, 2000). That document is incorporated herein by reference in its entirety for all purposes.

In conventional DOCSIS systems, the CMTS may include a plurality of physically distinct line cards having appropriate hardware for communicating with cable modems in the network. Each line card is typically assigned to a separate DOCSIS domain, which is a collection of downstream and upstream channels for which a single MAC Allocation and Management protocol operates. Typically, each DOCSIS domain includes a single downstream channel and one or more upstream channels. The downstream channel is used by the CMTS to broadcast data to all cable modems (CMs) within that particular domain. Only the CMTS may transmit data on the downstream. In order to allow the cable modems of a particular DOCSIS domain to transmit data to the CMTS, the cable modems share one or more upstream channels within that domain.

Channel Quality Detection

It will be appreciated that the performance of data communication in a conventional cable network may be dependent upon channel conditions of the upstream and/or downstream channels in the cable network. For this reason, it is desirable to monitor conditions of the upstream channels of the cable network in order to provide for effective management and use of each of the upstream channels. For example, if it is determined that conditions on a particular upstream channel are below acceptable quality levels, the CMTS may instruct cable modems on that channel to hop to a second upstream channel and begin using the second upstream channel for communicating with the CMTS.

One indicator which is typically used to evaluate channel conditions of a selected channel is the signal-to-noise ratio (SNR) associated with that channel. Typically, in most HFC networks, the SNR value for each upstream channel is measured and calculated using an off-the-shelf component such as, for example, the ASIC chip BCM3137, manufactured by Broadcom Corporation of Irvine, Calif.

Conventional techniques for determining the SNR value of a selected upstream channel are typically based upon Error Vector Magnitude (EVM) calculations, which are generally known to one having ordinary skill in the art. For example, a conventional ASIC chip configured to measure SNR on a particular upstream channel of an HFC network continuously monitors the upstream channel for received signals. When a signal is detected, the ASIC analyzes the signal to determine codes or symbols which may be embedded therein according to a predetermined format or protocol. For each symbol detected in the received signal, the ASIC determines the Error Vector Magnitude (EVM) for that symbol. The EVM value represents the amount of deviation that exists between the vector position of the detected symbol and the theoretically ideal position of that symbol. Once the EVM value for a particular symbol has been determined, a SNR value may then be calculated using a predetermined formula generally known to one having ordinary skill in the art. Additionally, it is typically the case that the ASIC computes an average SNR value for the selected upstream channel using the EVM values associated with that channel. A more detailed description of channel SNR measurement is provided in U.S. Pat. No. 5,862,451, to Grau, et al., issued on Jan. 19, 1999, and entitled "Channel Quality Management in a Cable Telephony System", which is incorporated herein by reference in its entirety for all purposes.

Using conventional EVM-based techniques, the calculation of the SNR value for a selected channel may only be performed if a signal lock is achieved on the selected channel. Thus, under ideal network conditions, the EVM-based technique for determining SNR values for selected upstream channels may yield satisfactory results. However, as conditions on a particular upstream channel deteriorate, the calculated SNR value for that channel may include a substantial amount of error, making the calculated SNR value substantially inaccurate. Additionally, the calculated SNR value does not take into account corrupted data received on the selected channel, which further compromises the accuracy of the SNR calculation. Further, in situations where only a relatively small amount of data is available to be used for calculating the SNR value (such as, for example, periods immediately following initialization or restart of a particular channel), the accuracy of the calculated SNR value (using conventional techniques) may be extremely poor. Accordingly, it will be appreciated that erroneous or inaccurate calculation of SNR values may result in poor management and performance of channels in the data network.

A further limitation of conventional EVM-based SNR calculating techniques is that such techniques are incapable of performing SNR analysis on a node by node basis. For example, the ASIC chip BCM3137 is incapable of performing SNR analysis for one or more specific modems of an upstream channel. Moreover, the ASIC is incapable of distinguishing data received from different cable modems on the selected channel. As a result, it is not possible, using conventional SNR calculating techniques, to determine whether a relatively low SNR value is attributable, for example, to ingress noise on the selected channel or is attributable to one or more faulty cable modems on the selected channel.

In light of the above, it is desirable to provide an improved SNR calculation technique which provides greater flexibility and accuracy.

SUMMARY OF THE INVENTION

According to a specific embodiment of the present invention, a method and computer program product are disclosed for determining a carrier-to-noise ratio (CNR) value for a selected channel of an access network. The access network includes a plurality of network nodes which communicate with a Head End via the selected channel. A background noise level on the selected channel is measured during a first time interval during which none of the network nodes are transmitting signals on the selected channel. A first carrier signal strength on the selected channel is also measured during a second time interval during which a first network node is transmitting at least one signal on the selected channel. A CNR value for the selected channel may then be calculated using the measured background noise level information and the measured first carrier signal strength information. According to a specific implementation, the calculation of the CNR value for the selected channel is not based upon an Error Vector Magnitude value associated with the signal transmitted from the first network node.

According to an alternate embodiment of the present invention, a method is disclosed for determining a signal-to-noise ratio (SNR) value for a selected channel of an access network. The access network includes a plurality of network nodes which communicate with a Head End via the selected channel. A background noise level on the selected channel is measured during a first time interval during which none of the network nodes are transmitting signals on the selected channel. A first signal strength on the selected channel is also measured during a second time interval during which a first network node is transmitting at least one signal on the selected channel. An SNR value for the selected channel may then be calculated using the measured background noise level information and the measured first signal strength information. According to a specific implementation, the calculation of the SNR value for the selected channel is not based upon an Error Vector Magnitude value associated with the signal transmitted from the first network node.

Another embodiment of the present invention is directed to a system for determining a CNR value for a selected channel of an access network. The access network includes a plurality of network nodes. The system comprises a Head End in communication with at least a portion of the network nodes. The Head End comprises at least one CPU, memory, at least one interface configured to receive signals from the network nodes via the selected channel, and at least one analog-to-digital converter configured to analyze signals on the selected channel. The Head End is configured to measure a background noise level on the selected channel during a first time interval when none of the network nodes are transmitting signals on the selected channel. According to a specific embodiment, the Head End may configured to instruct at least a portion of the network nodes not to transmit any signals on the selected channel during the first time interval. The Head End is also configured to measure a first signal strength of a first signal transmitted on the selected channel by a first network node during a second time interval. According to a specific implementation, the Head End may be configured to instruct the network nodes to allow only the first network node to transmit signals on the selected channel during the second time interval. Additionally, the Head End is also configured to calculate a CNR value for the selected channel using the measured background noise level information and the measured first signal strength information.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

Figure 1:
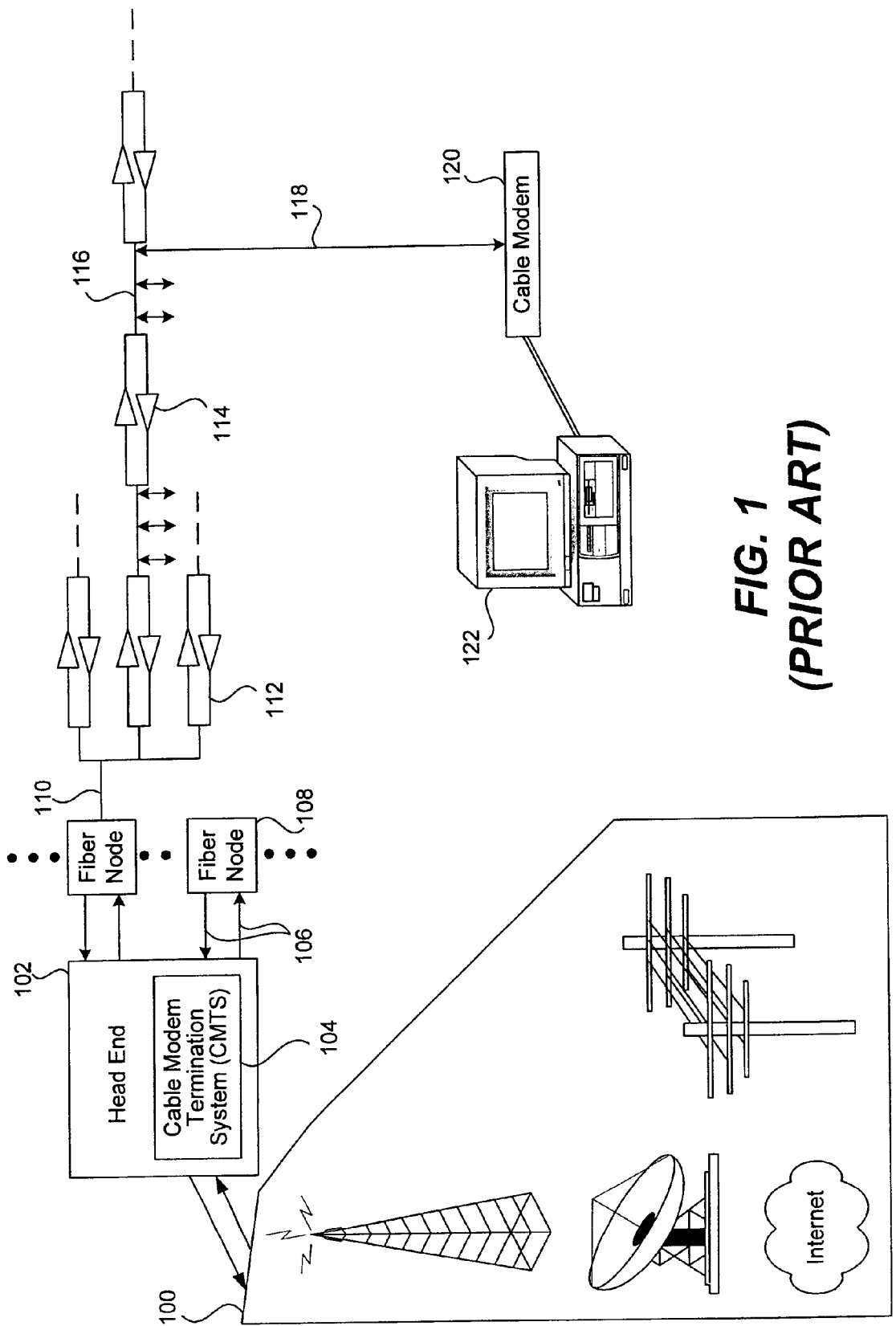
FIG. 1 shows a block diagram of a conventional HFC network.

The present application describes a technique which may be used for determining the carrier-to-noise ratio (CNR) of a selected channel of an access network. According to at least one embodiment, an access network may include any data network having a plurality of network nodes which use at least one time division multiplexed channel for communicating with other nodes or network devices in the network. Examples of access networks include HFC networks (such as that shown, for example, in FIG. 1), wireless networks (such as that shown, for example, in FIG. 10), Ethernet networks, FastEthernet networks, GigabitEthernet networks, LANs, etc. For purposes of illustration, the technique of the present invention will be described in terms of its application in an HFC network such as that shown in FIG. 1. However, it will be appreciated by one having ordinary skill in the art that the technique of the present invention may be modified to be implemented in any type of access network. Such modifications will be apparent to one having ordinary skill in the art.

As described previously, conventional techniques for determining the SNR value of a selected channel in a HFC network utilize Error Vector Magnitude (EVM) measurements, and typically yield results which do not have a high degree of accuracy. Unlike conventional SNR measurement techniques, the technique of the present invention is able to achieve accurate SNR or CNR measurement values by scheduling timeslots on the selected channel which are specifically used for collecting signal and noise information. Thus, for example, in accordance with a specific embodiment of the present invention, special CNR timeslots may be allocated on a particular upstream channel of a cable network in order to gather signal and noise information which may be then used to calculate the CNR value for that specific upstream channel.

More specifically, a first CNR timeslot may be scheduled on the upstream channel to measure the background noise or noise power for that upstream channel. In order to assure that only the background noise is measured during the first CNR timeslot, the CMTS may instruct each of the cable modems on the upstream channel to not transmit any signals on the upstream channel during the time period corresponding to the first CNR timeslot. A second CNR timeslot is also scheduled on the upstream channel to measure the carrier signal strength or carrier signal power of a signal which is transmitted by a selected cable modem. Thus, according to a specific implementation, the second CNR timeslot is reserved for use exclusively by a specified cable modem, meaning that only the specified cable modem should be transmitting signals during the time interval corresponding to the second CNR timeslot on the upstream channel Once the carrier signal and noise power measurements have been performed on the selected channel, the CNR value of that channel may then be calculated.

Figure 2:
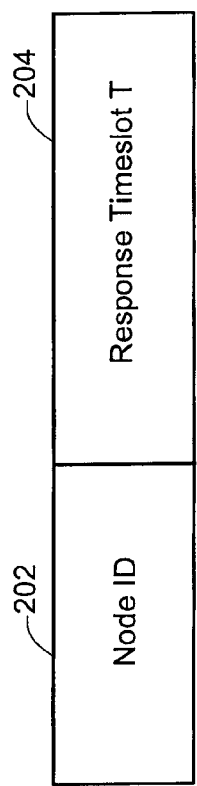
FIG. 2 shows a block diagram of a CNR request message which may be transmitted to a specific node in the data network.

FIG. 2 shows a block diagram of a CNR request message which may be transmitted to a specific node in the data network. As shown in FIG. 2, the CNR response request message includes a first portion of information 202 for identifying a particular network node, and a second portion of information 404 specifying the time parameters for the scheduled CNR timeslot in which the specified node is to transmit a response on the selected channel.

According to at least one embodiment where the access network is configured to utilize the DOCSIS protocol, the first and second CNR timeslots may be implemented using conventional DOCSIS station maintenance timeslots. According to the DOCSIS protocol, when a station maintenance timeslot is scheduled for a specified cable modem (or node), and transmitted in a downstream channel MAP message to the cable modem, the cable modem is required to respond during the scheduled station maintenance timeslot by transmitting ranging information to the CMTS on the upstream channel at the time interval specified by the station maintenance timeslot. Thus, in the example of FIG. 2, the CNR request response message 200 may correspond to a station maintenance request message, wherein the node identifier portion 202 represents the Service ID (SID) corresponding to a particular cable modem, and the response timeslot portion 204 represents the time parameters associated with the scheduled stationed maintenance timeslot for that cable modem on the selected upstream channel.

Figure 5:
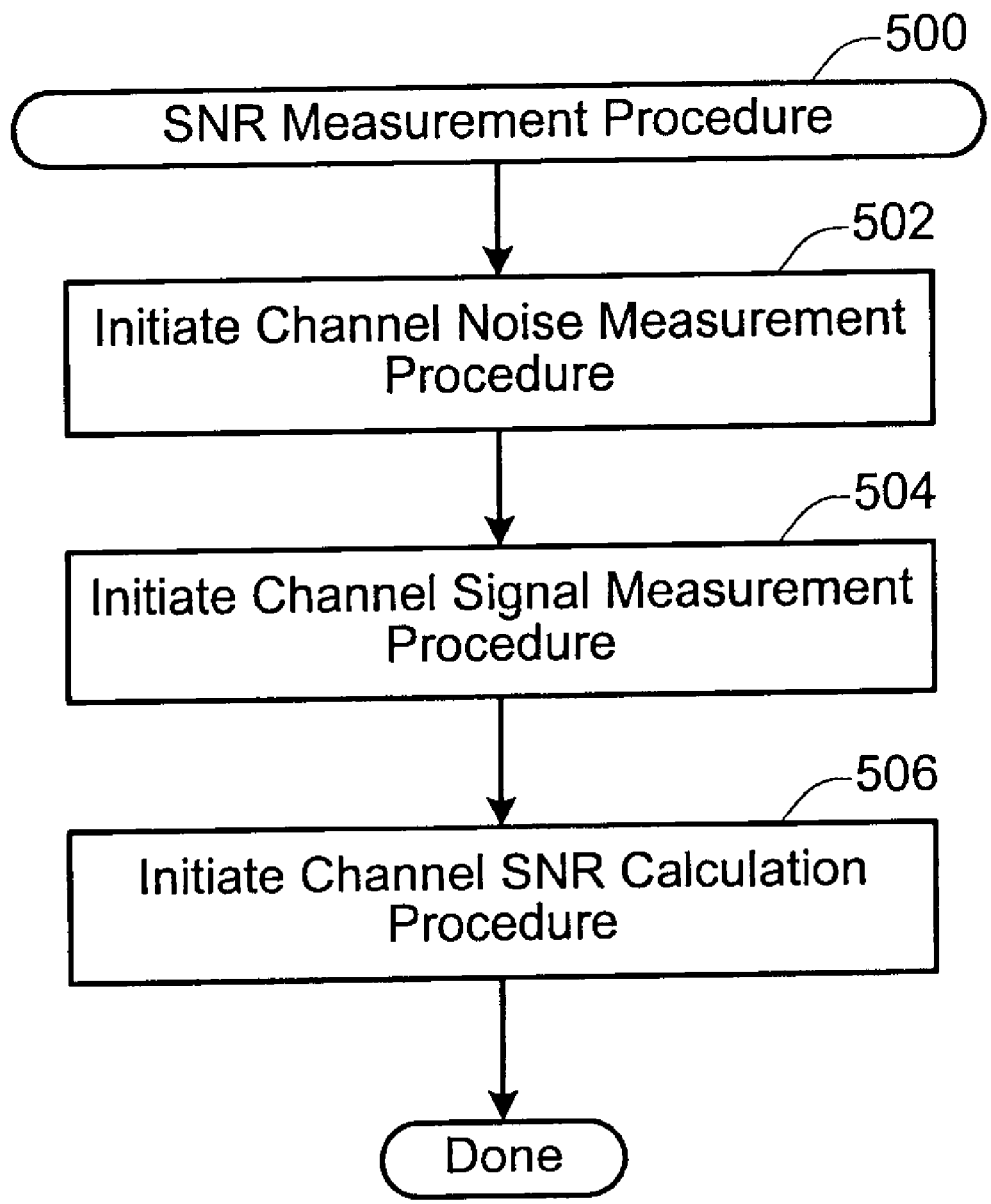
FIG. 5 shows a flow diagram of a CNR Measurement Procedure 500 in accordance with a specific embodiment of the present invention.

FIG. 5 shows a flow diagram of a CNR Measurement Procedure 500 in accordance with a specific embodiment of the present invention. According to a specific implementation, the CNR procedure may be implemented at the Head End or CMTS of an HFC network. In order to measure the CNR value for a selected channel, the CNR Measurement Procedure initiates (502) a Channel Noise Measurement Procedure for measuring the background noise level of the selected channel. A specific embodiment of a Channel Noise Measurement Procedure is shown, for example, in FIG. 6 of the drawings.

Additionally, the CNR Measurement Procedure also initiates (504) a Channel Signal Measurement Procedure for measuring the carrier signal strength of a signal transmitted by a network node on the selected channel. A specific embodiment of a Channel Signal Measurement Procedure is shown, for example, in FIG. 7 of the drawings. In an alternate embodiment, the Channel Signal Measurement Procedure may be initiated before initiation of the Channel Noise Measurement Procedure.

After the measurements of the channel noise level and carrier signal strength have been performed for the selected channel, a Channel CNR Calculation Procedure may then be initiated (506) in order to calculate the CNR value for the selected channel. A specific embodiment of the Channel CNR Calculation Procedure is shown, for example, in FIG. 8 of the drawings.

Figure 6:
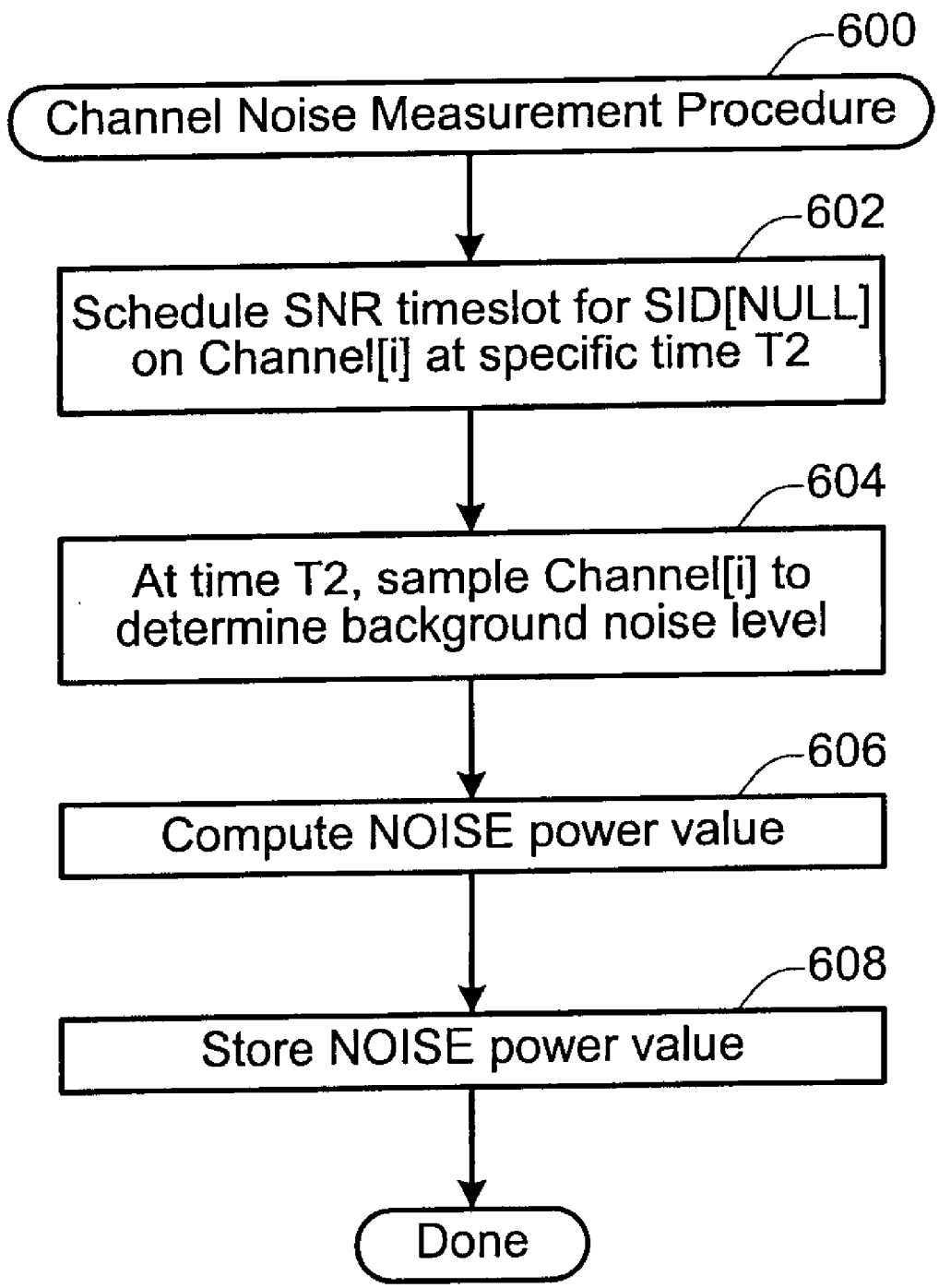
FIG. 6 shows a flow diagram of a Channel Noise Measurement Procedure 600 in accordance with a specific embodiment of the present invention.

FIG. 6 shows a flow diagram of a Channel Noise Measurement Procedure 600 in accordance with a specific embodiment of the present invention. In the embodiment of FIG. 6, it is assumed that the Channel Noise Measurement Procedure 600 is implemented at the Head End of an HFC network. At 602, the Head End schedules a CNR timeslot on the desired upstream channel for which the CNR value is to be determined. In accordance with a specific implementation, the CNR timeslot corresponds to a station maintenance timeslot defined by the DOCSIS protocol. As described previously with respect to FIG. 2, a station maintenance timeslot typically reserves a specific time interval on the upstream channel for a specified cable modem to transmit ranging information. The specified cable modem is typically identified by a unique Service ID (SID) value or other identifier assigned to that particular cable modem.

However, the DOCSIS protocol also allows for a NULL SID value (e.g. SID [0]) to be specified for a station maintenance timeslot. Since the NULL SID value does not correspond to any of the cable modems on the upstream channel, none of the cable modems will have permission to talk on the upstream channel during the time interval corresponding to the CNR station maintenance timeslot. Therefore, when a station maintenance timeslot specifying a NULL SID is scheduled (602) on the upstream channel at time T2, the CMTS will be able to measure the background noise level or noise power on the upstream channel during the T2 time interval.

Accordingly, at time T2, the CMTS samples (604) the upstream channel in order to determine the background noise level on that channel. After the sampling has been performed, the noise power value for the selected channel is then computed (606) and stored (608).

According to a specific embodiment, the sampling of the selected channel may be performed by an analog-to-digital (A/D) converter such as, for example, the AD 9701 A/D converter manufactured by Analog Devices, Inc., of Norwood, Mass. The sampled data may then be analyzed, for example, using Fast Fourier Transform (FFT) analysis in order to determine the noise power levels for desired frequencies on the upstream channel. In a specific implementation, the CMTS may be configured to include a device specifically configured to perform the A/D sampling functions and the FFT calculations. Such a device is shown, for example, in FIG. 9 as reference block 915. According to a specific implementation, reference block 915 may be configured as a DSP-based daughter card which includes an A/D converter for performing the above-described channel sampling functions, and may also include a field programmable gate array (FPGA) configured to function as an FFT engine for performing the FFT analysis. Additionally, as shown, for example, in FIG. 9, the data collected by block 915 may be analyzed and/or processed by spectrum management software 987 residing at the CMTS.

Figure 7:
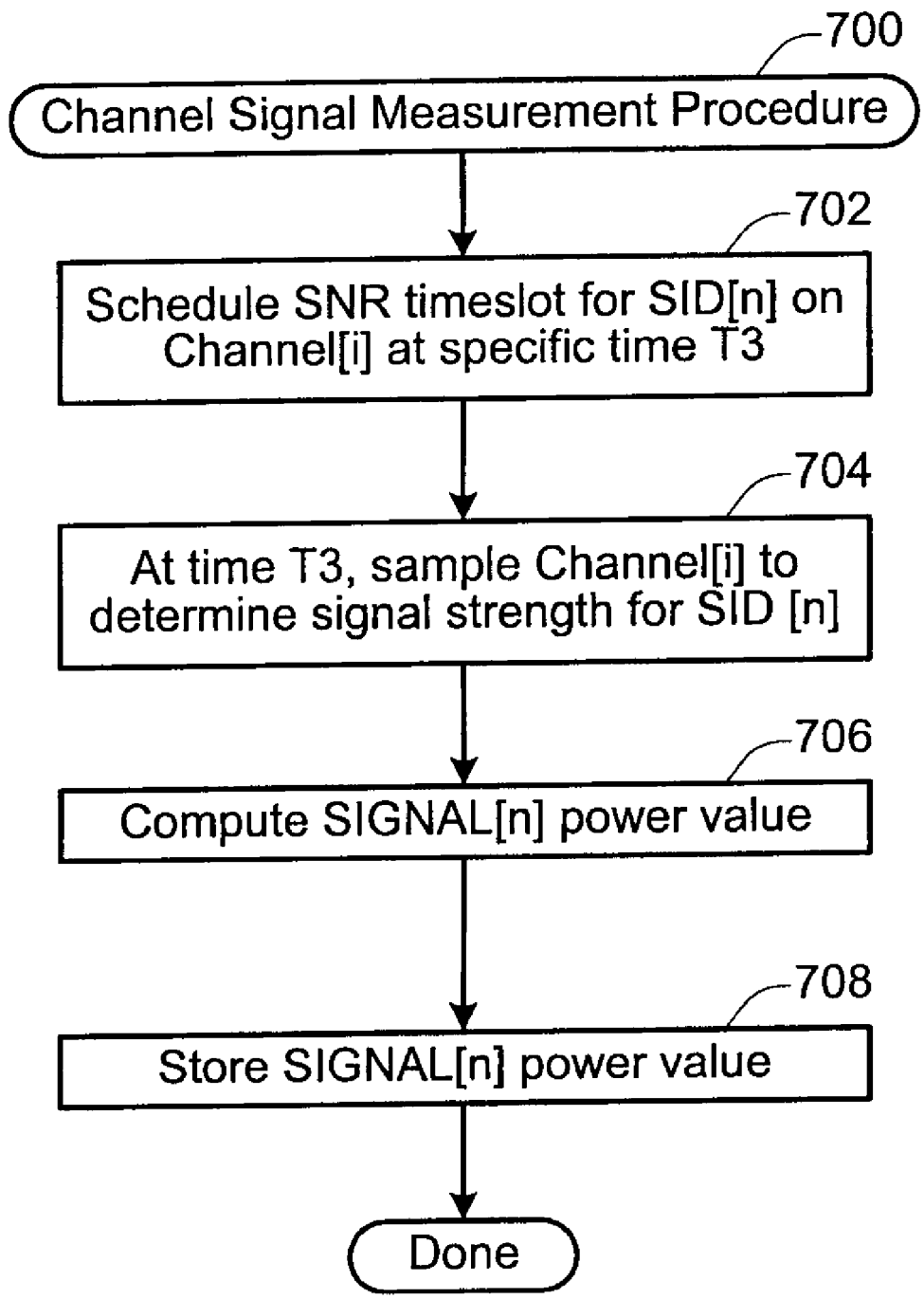
FIG. 7 shows a flow diagram of a Channel Signal Measurement Procedure 700 in accordance with a specific embodiment of the present invention.

FIG. 7 shows a flow diagram of a Channel Signal Measurement Procedure 700 in accordance with a specific embodiment of the present invention. One function of the Channel Signal Measurement Procedure 700 is to determine a signal power value for a carrier signal transmitted by one or more cable modems on the selected upstream channel. In the embodiment of FIG. 7, it is assumed that the Channel Signal Measurement Procedure 700 is implemented at the CMTS of an HFC network.

At 702 the CMTS schedules a CNR timeslot on the upstream channel for a specified cable modem at a specific time interval, represented by T3. According to a specific implementation, the CNR timeslot may correspond to a station maintenance timeslot reserved for a specific cable modem identified as SID[n], where the value n represents the value of the identifier assigned to that specific cable modem.

The cable modem corresponding to SID[n] is required to transmit a response to the CMTS during the scheduled station maintenance timeslot starting at time T3. Therefore, at time T3, the CMTS samples (704) the selected upstream channel to determine the signal power value for SID [n]. The sampled data may then be analyzed by the FFT engine in order to compute (706) a signal power value for the associated cable modem. The computed signal power value may then be stored (708) in memory.

Figure 4:
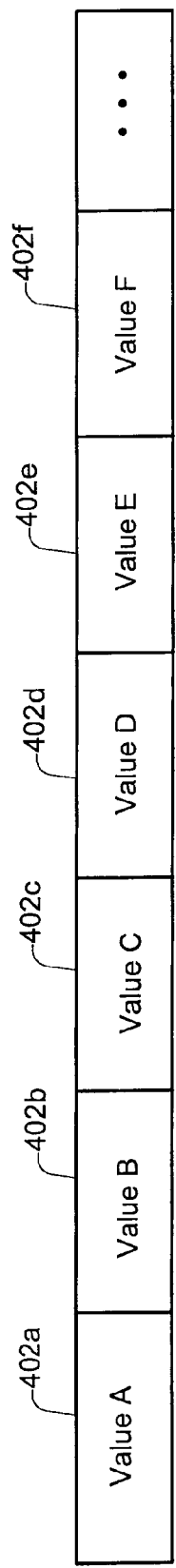
FIG. 4 shows a block diagram illustrating the result of computed signal or noise power value in accordance with a specific embodiment of the present invention.

According to a specific embodiment, the computed signal power value may include an array of signal power values corresponding to different frequencies on the selected channel. This is shown, for example, in FIG. 4 of the drawings. FIG. 4 shows a block diagram illustrating the result of computed signal or noise power value in accordance with a specific embodiment of the present invention. As shown in FIG. 4, the power value array 400 includes a plurality of power values (e.g. 402a–402f), wherein each power value corresponds to a respective frequency or frequency range (Freq. A–F) on the upstream channel. Thus, according to one implementation, the noise or signal power value may be stored at the CMTS as an array of values as shown, for example, in FIG. 4. According to a specific implementation, each of the values in the array 400 of FIG. 4 may be expressed in terms of decibel-millivolts or dBmV.

Figure 8:
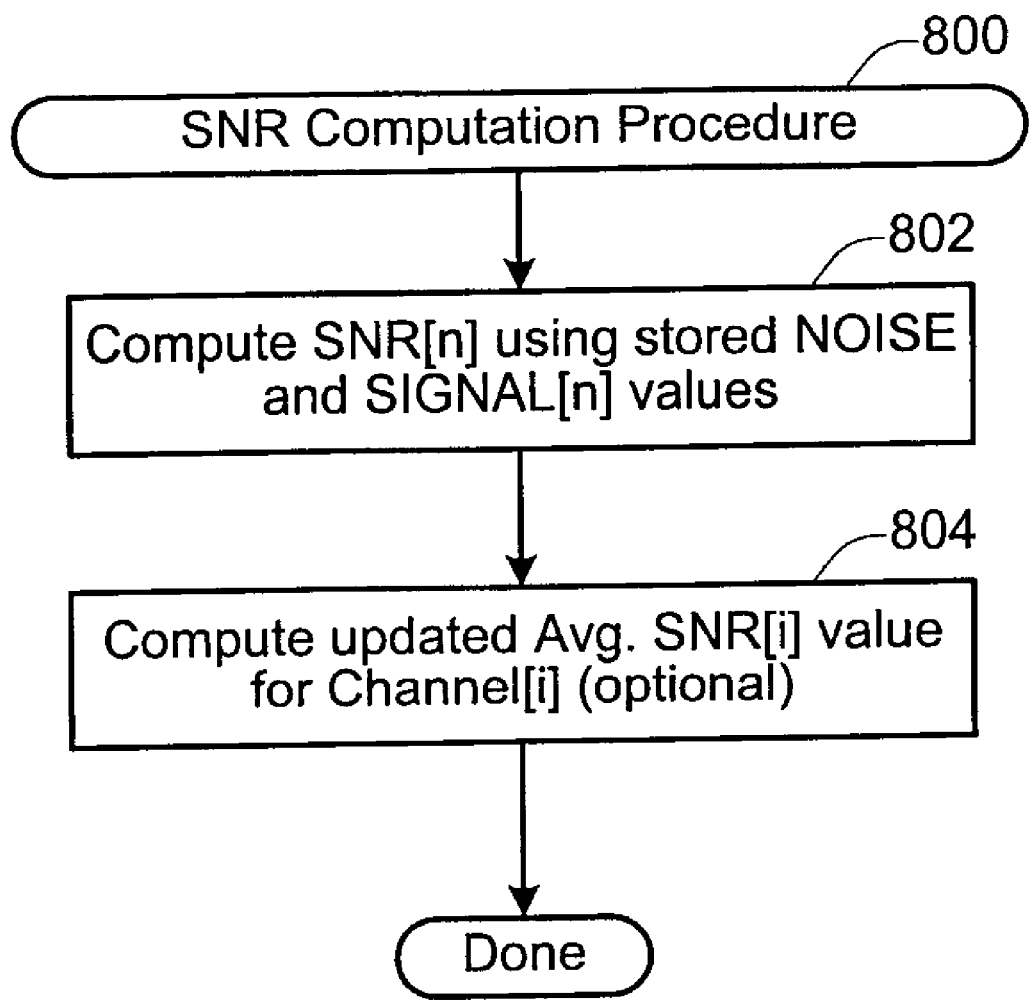
FIG. 8 shows a flow diagram of a CNR computation procedure 800 in accordance with a specific embodiment of the present invention.

Once the background noise level and signal power values for the selected channel have been determined, it is then possible to calculate the CNR value for the selected channel as shown, for example, in FIG. 8 of the drawings. FIG. 8 shows a flow diagram of a CNR computation procedure 800 in accordance with a specific embodiment of the present invention.

As shown at 802, the CNR value may be calculated using the stored noise power value and the stored signal power value. Computation of the CNR value using the noise power and signal power information will generally be known to one having ordinary skill in the art. For example, if the noise and signal power values are expressed in terms of dBmV, the CNR value may be determined by subtracting the noise power value from the signal power value.

It will be appreciated that, where the noise power value and signal power value are each stored as an array of values (as shown, for example, in FIG. 4), the resulting CNR value may also be expressed in terms of an array of values, wherein each value represents the carrier-to-noise ratio of a corresponding frequency or frequency range on the selected channel. If desired, it is also possible to compute an average CNR value for a desired frequency range on the selected channel using the information contained in the array of CNR values.

It will be appreciated that the technique of the present invention provides the ability to perform CNR analysis for any desired network node on any selected channel. In this way, the respective CNR value for each node on a selected channel may be calculated in order to detect faulty node transmissions. Additionally, it will be appreciated that the technique of the present invention also provides the ability to implement spectrum analysis of a selected channel for any desired network node on that channel or for any desired frequency of that channel.

According to at least one embodiment of the present invention, it is desirable to perform the CNR Measurement Procedure of FIG. 5 for each cable modem that is configured to talk to the CMTS using the selected upstream channel. Accordingly, the Channel Signal Measurement Procedure 700 may be implemented for each different cable modem using the selected upstream channel. According to a specific implementation, this may be done in a continuous, round-robin fashion.

For each new CNR value to be measured, a separate CNR timeslot should preferably be scheduled, specifying the particular cable modem that is to transmit its signal on the upstream channel during that timeslot. Thus, as shown in FIG. 7, each time the Channel Signal Measurement Procedure schedules a new CNR timeslot for a selected cable modem (identified as SID[n]), a respective signal power value will be computed for that cable modem, which, as shown in FIG. 7, may be identified as the SIGNAL[n] power value, where the variable n represents the SID value associated with the selected modem.

Additionally, as shown at 804 of FIG. 8, it may be desirable to compute an updated average CNR value for the selected upstream channel. According to a specific implementation, the average CNR value may be calculated by averaging the stored signal[n] power values associated with the selected channel and then computing the average CNR value using the average signal power value and the NOISE power value calculated, for example, in FIG. 6.

Timing Aspects

According to at least one embodiment of the present invention, the CNR Measurement Procedure 500 may be implemented at periodic intervals or as desired. In specific embodiments where management and/or performance of the selected channel is dependent upon channel conditions (such as, for example, the CNR of that channel), it may be desirable to implement the CNR management procedure at relatively frequent periodic intervals in order to ensure rapid detection of any changes in the channel quality. Thus, for example, according to one implementation the CNR management procedure may be implemented at periodic intervals which may range, for example, from about every 50 milliseconds to about every 2 seconds.

Figure 3:
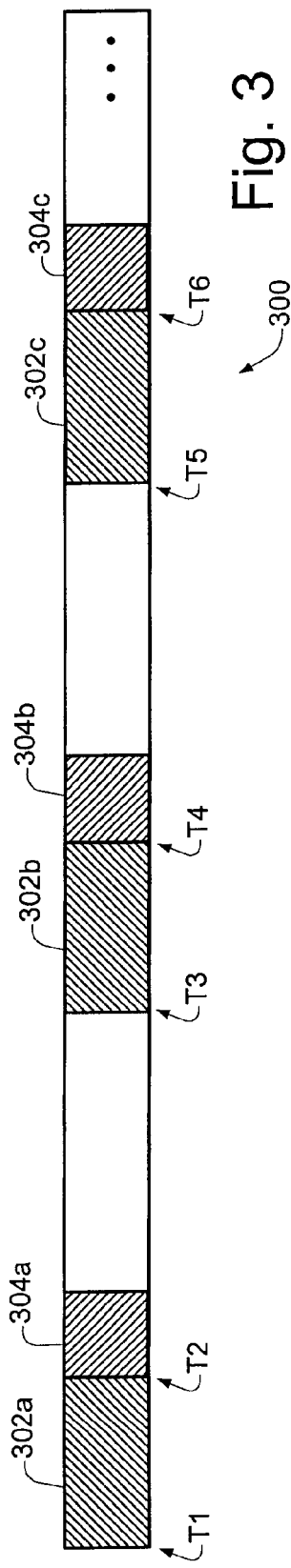
FIG. 3 shows a block diagram of different timeslots which may be scheduled on an upstream channel 300 of an HFC network.

One technique for managing the scheduling of each CNR timeslot is illustrated in FIG. 3 of the drawings. FIG. 3 shows a block diagram of different timeslots which may be scheduled on an upstream channel 300 of an HFC network. According to the embodiment of FIG. 3, each CNR timeslot (304a, 304b, 304c) may be scheduled to immediately follow a respective scheduled initial maintenance timeslot (sometimes referred to as an initial ranging timeslot).

The functions and scheduling aspects of the initial maintenance timeslots are described in detail in the DOCSIS specification (referenced above). According to one embodiment, initial maintenance timeslots may be scheduled on a selected upstream channel at periodic intervals which may range, for example, from about every 60 milliseconds to about every 2 seconds. Additionally, according to at least one implementation, it may be preferable to insert a "safety buffer" timeslot between the initial maintenance timeslot and the CNR timeslot in order to ensure that all cable modems on the upstream channel have finished their transmissions by the time the CNR timeslot commences.

Another advantage of scheduling the CNR timeslot to immediately follow an initial maintenance timeslot is that, according to at least one embodiment, the CMTS may be configured to schedule time aligned initial maintenance messages such that any scheduled initial maintenance message will be simultaneously scheduled for the same timeslot across all upstream channels controlled by the CMTS. This technique of scheduling time aligned initial maintenance slots across all upstream channels provides the advantage of allowing a quiet period to be scheduled on all upstream channels immediately following the initial maintenance timeslot. During this quiet period, each of the cable modems on each of the upstream channels may be asked to be silent. Moreover, the silent period provides a number of advantages, such as, for example, allowing more accurate measurement of ingress noise, allowing more accurate measurement of channel cross talk or bleedover, allowing detection of faulty cable modems, etc.

According to a specific embodiment, a signal-to-noise ratio (SNR) value for a selected channel may be also calculated using the technique of the present invention. For example, a signal strength value for a selected cable modem may be determined by demodulating the carrier signal to thereby allow signal strength measurement of the embedded data signal. A ratio of the signal strength value and noise power value for the selected channel may then be computed to arrive at the SNR value.

As described herein, the technique of the present invention provides for accurate real-time measurement of SNR or CNR values on any desired channel of an access network. The accurate SNR or CNR data may then be used to assess channel quality which, in turn, may help to improve the management of channel use such as node frequency hopping, for example. Additionally, according to at least one embodiment of the present invention, the technique of the present invention may be easily implemented in conventional HFC networks that are configured to utilize the standard DOCSIS protocol.

CMTS Configurations

Generally, the CNR measurement technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention may be implemented in software such as an operating system or in an application running on an operating system.

A software or software/hardware hybrid system of this invention is preferably implemented on a general-purpose programmable machine selectively activated or reconfigured by a computer program stored in memory. Such a programmable machine may be a network device designed to handle network traffic. Such network devices typically have multiple network interfaces. One important class of device that may be used to implement the present invention is the Cable Modem Termination System. Preferably, the CMTS is a "routing" CMTS, which handles at least some routing functions. Alternatively, the CMTS may be a "bridging" CMTS, which handles only lower-level tasks.

Figure 9:
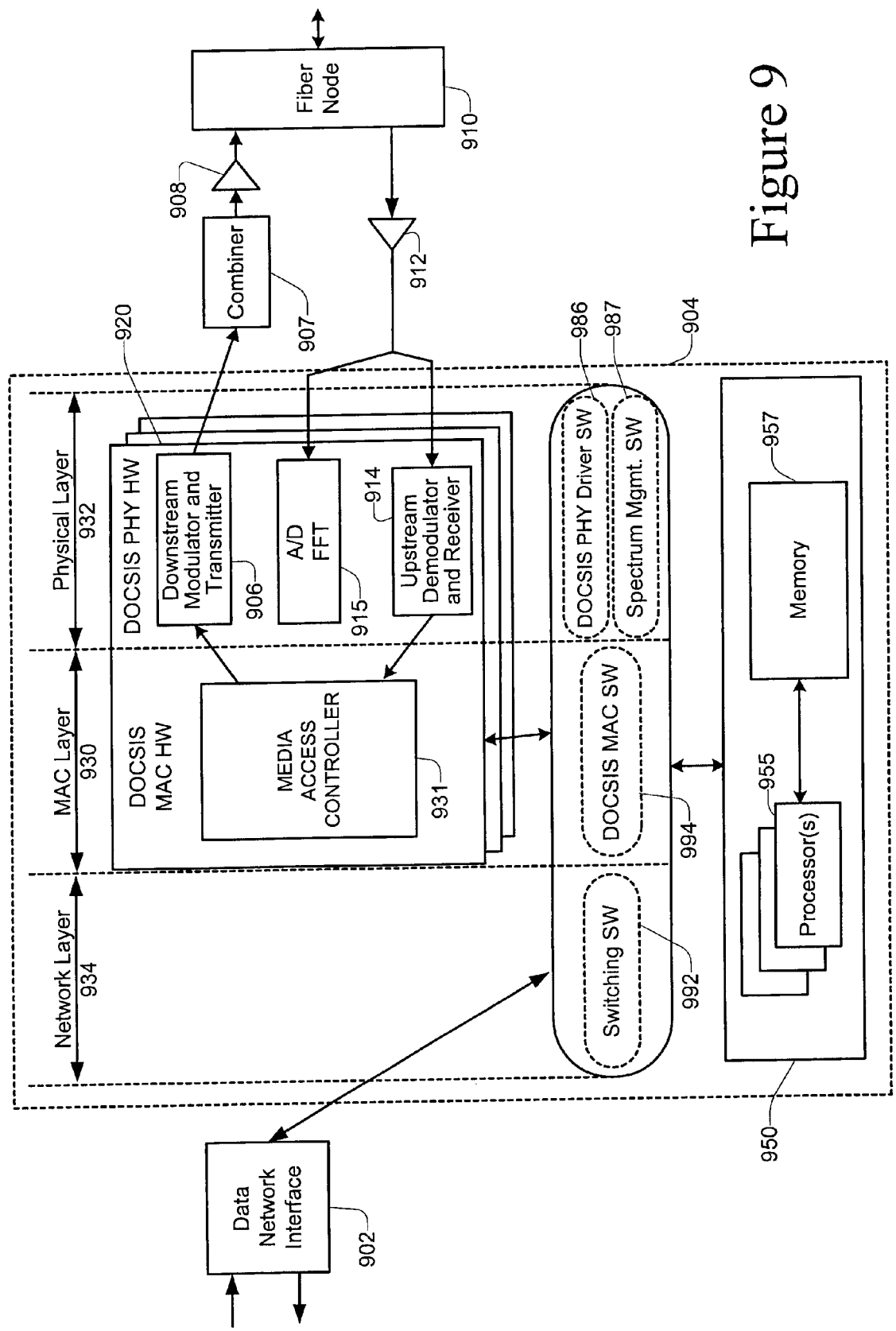
FIG. 9 provides an example of some components of a CMTS that may be used to implement certain aspects of this invention.

FIG. 9 provides an example of some components of a CMTS that may be used to implement certain aspects of this invention. In the specific embodiment as shown in FIG. 9, a CMTS 904 provides functions on three network layers including a physical layer 932, a Media Access Control (MAC) layer 930, and a network layer 934. Generally, the physical layer is responsible for receiving and transmitting RF signals on the cable plant. Hardware portions of the physical layer include a downstream modulator and transmitter 906, A/D converter and FFT engine components 915, and an upstream demodulator and receiver 914. The physical layer also includes software 986 for driving the hardware components of the physical layer, and may also include spectrum management software 987 for analyzing data collected by the A/D converter and/or FFT engine components.

Upstream optical data signals (packets) arriving via an optical fiber node 910 are converted to electrical signals by a receiver 912. A/D converter block 915 analyzes the upstream signals to determine the noise and signal strength power levels on the upstream channel. Additionally, the upstream information packet (RF electrical signals) is demodulated by the demodulator/receiver 914 and then passed to MAC layer block 930.

A primary purpose of MAC layer 930 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. The MAC headers include addresses to specific modems or to the CMTS (if sent upstream) by a MAC layer block 930 in CMTS 904. Note that the cable modems also include MAC addressing components. In the cable modems, these components encapsulate upstream data with a header containing the MAC address of the CMTS.

MAC layer block 930 includes a MAC hardware portion (e.g. MAC controller) 931 and a MAC software portion 984, which together serve the above-described functions. In a preferred embodiment, MAC hardware portion 931 is distinct from the router's general-purpose microprocessor and is dedicated to performing some MAC layer functions.

In specific CMTS configurations, the hardware portions of the physical layer 932 and MAC layer 930 reside on physical line cards 920 within the CMTS. The CMTS may include a plurality of distinct line cards which service particular cable modems in the network. Each line card may be configured to have its own unique hardware portions of the physical layer 932 and MAC layer 930.

After MAC layer block 930 has processed the upstream information, it is then passed to network layer block 934. Network layer block 934 includes switching software 982 for causing the upstream information packet to be switched to an appropriate data network interface on data network interface 902. When a packet is received at the data network interface 902 from an external source, the switching software within network layer 934 passes the packet to MAC layer 930. MAC block 904 then transmits information via a one-way communication medium to downstream modulator and transmitter 906. Downstream modulator and transmitter 906 takes the data (or other information) in a packet structure and converts it to modulated downstream frames, such as MPEG or ATM frames, on the downstream carrier using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The return data is likewise modulated using, for example, QAM16 or QSPK. According to a specific embodiment, the modulated data is converted from IF electrical signals to RF electrical signals (or vice-versa) using one or more electrical signal converters (not shown). Data from other services (e.g. television) may be added at a combiner 907. An optical converter 908 converts the modulated RF electrical signals to optical signals that can be received and transmitted via Fiber Node 910 to the cable modem hub.

Note that alternate embodiments of the CMTS (not shown) may not include network layer 934. In such embodiments, a CMTS device may include only a physical layer and a MAC layer, which are responsible for modifying a packet according to the appropriate standard for transmission of information over a cable modem network. The network layer 934 of these alternate embodiments of CMTS devices may be included, for example, as part of a conventional router for a packet-switched network. In a specific embodiment, the network layer of the CMTS is configured as a cable line card coupled to a standard router that includes the physical layer block 932 and MAC layer block 930. Using this type of configuration, the CMTS is able to send and/or receive IP packets to and from the data network interface 902 using switching software block 982.

The data network interface 902 is an interface component between external data sources and the cable system. The external data sources transmit data to the data network interface 902 via, for example, optical fiber, microwave link, satellite link, or through various media. The data network interface includes hardware and software for interfacing to various networks such as, for example, Ethernet, ATM, frame relay, etc.

As shown in FIG. 9, CMTS 904 includes a central hardware block 950 including one or more processors 955 and memory 957. These hardware components interact with software and other hardware portions of the various layers within the CMTS. They provide general purpose computing power for much of the software. Memory 957 may include, for example, I/O memory (e.g. buffers), program memory, shared memory, etc. One or more data structures used for implementing the technique of the present invention may reside in such memory. Hardware block 950 may physically reside with the other CMTS components. In one embodiment, the software entities 982, 984, and 986 are implemented as part of a network operating system running on hardware 950. Preferably, at least a part of the CNR measurement functionality of this invention are implemented in software as part of the operating system. In FIG. 9, such software may be part of MAC layer software 984 and/or the switching software 982, or may be closely associated therewith. Of course, the CNR measurement logic of the present invention could reside in hardware, software, or some combination of the two.

The procedures employed by the CMTS during registration and pre-registration are preferably performed at the MAC layer of the CMTS logic. Thus, in CMTS 904, most of the registration operations would be performed by the hardware and software provided for MAC layer logic 930.

The operations associated with obtaining an IP address for cable modems are preferably implemented at the network layer level 934. As noted, this may involve the CMTS communicating with a DHCP server (not shown) via data network interface 902, for example.

The upstream and/or downstream CNR measurement techniques of the present invention may be implemented on various general purpose Cable Modem Termination Systems. In a specific embodiment, the systems of this invention may be specially configured CMTSs such as, for example, specially configured models in the uBR-7200 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Although the system shown in FIG. 9 represents one specific CMTS architecture of the present invention, it is by no means the only CMTS architecture on which the present invention can be implemented. For example, other types of interfaces and media could also be used with the CMTS.

Regardless of network device's configuration (for cable plants or otherwise), it may employ one or more memories or memory modules (e.g., memory 957) configured to store program instructions for the network operations and other functions of the present invention described herein. The program instructions may specify an operating system and one or more applications, for example. Such memory or memories may also be configured to store data structures or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

It will be appreciated by one having ordinary skill in the art that the technique of the present invention may be implemented in any computer network having a standardized protocol for utilizing a central termination system (e.g. Head End) to schedule timeslots for remote stations or nodes on a return (or upstream) channel. In wireless networks, the central termination system may be referred to as a Head End or wireless base station. In satellite networks, the central termination system may be referred to as a master controlling station.

Other Embodiments

While the discussion to this point has focused on upstream and/or downstream CNR measurement techniques for cable networks, the technology of the present invention may be applied to any access or shared-access network having a plurality of hosts or nodes which share at least one channel for communicating with at least one "Head End" in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

In general, the methods and apparatus described above may be implemented on a traffic handling device (e.g., a switch or router) for providing CNR measurement capability in a network having at least one traffic handling device (e.g., another switch or router) that provides normal service to a host. In the wireless system (e.g., represented by FIG. 10) the plurality of nodes or hosts corresponds to the plurality of wireless nodes 1050 which use at least one shared access channel to communicate with at least one access control system 1022 located at the Head End of the wireless system.

Figure 10:
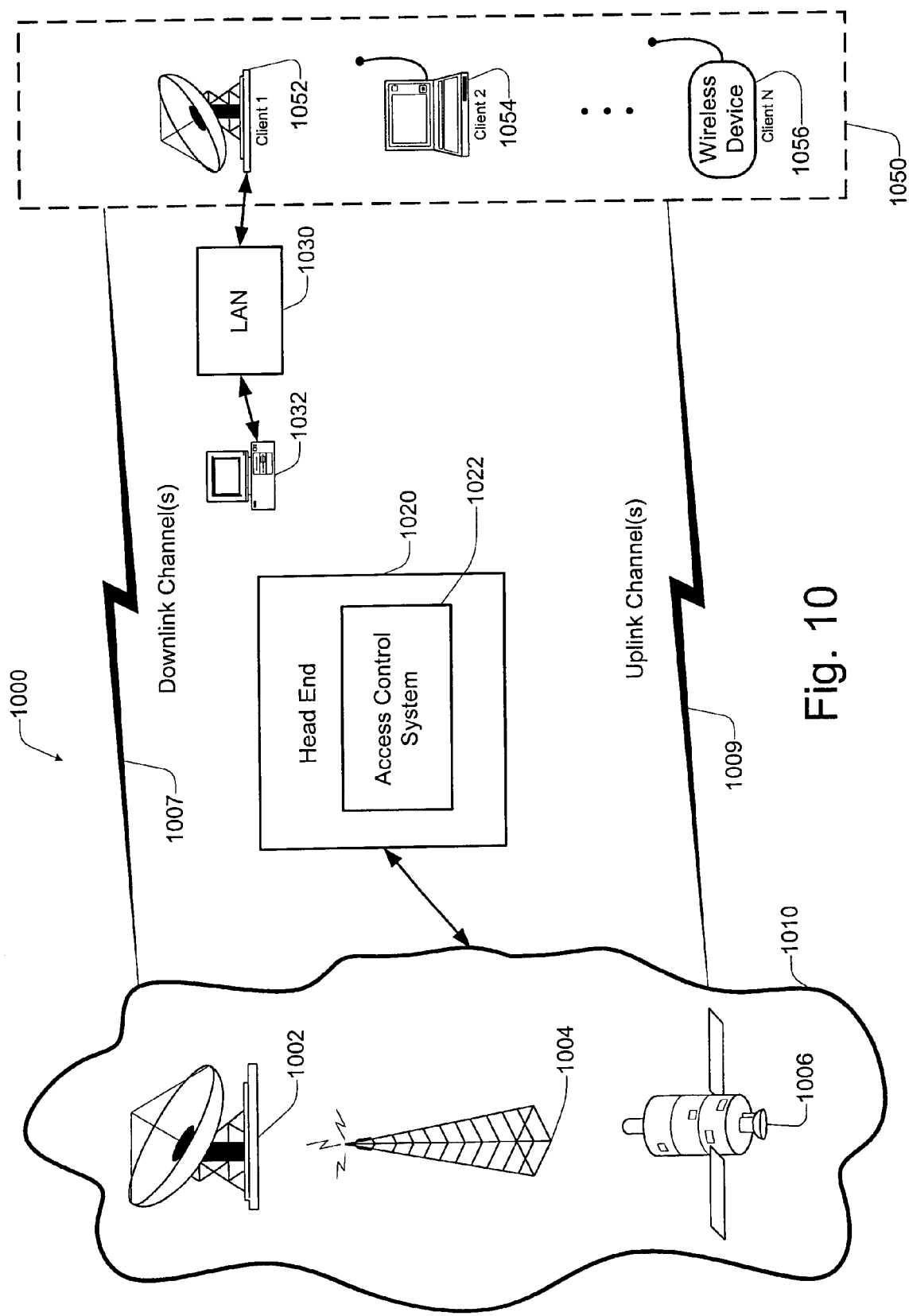
FIG. 10 shows an example of a wireless data communication system 1000 which may be used for implementing the technique of the present invention.

FIG. 10 shows an example of a wireless data communication system 1000 which may be used for implementing the technique of the present invention. As shown in FIG. 10, the wireless system includes a central termination system (or Head End) 1020. The Head End includes an access controller or access control system (ACS) 1022 which communicates with a plurality of wireless nodes 1050, and coordinates access between each of the wireless nodes and the Head End 1020. The access controller 1022 may include memory and at least one processor. In a specific embodiment, the function of the access controller 1022 is analogous to that of the CMTS described above with respect to cable modem networks. It may serve as a router or switch as well.

The Head End 1020 communicates with a plurality of wireless nodes 1050 via any one of a plurality of wireless transmitting and receiving devices 1010. As shown in FIG. 10, for example, the plurality of wireless transmitting and receiving devices 1010 may include satellite base stations 1002, orbital satellites 1006, radio towers 1004, etc.

In a specific embodiment which is analogous to that of cable modem networks, the Head End 1020 of the wireless computer system communicates with the plurality of nodes 1050 via one or more downlink channels 1007 and one or more uplink channels 1009. Each downlink channel 1007 is a broadcast-type channel utilized by the Head End to communicate with an associated group of wireless nodes within the wireless network. The uplink channel 1009 is a shared-access channel, which is utilized by a group of wireless nodes (analogous to cable modems) to communicate with the Head End 1020. The access controller 1022 stores registration parameters for the various nodes that it services. It may also store the IP addresses for nodes that it services.

In a specific embodiment of the present invention, the registration process and information is similar to that of the cable network CMTSs described above. Moreover, the technique of the present invention for CNR measurement capability over a shared access data network may be implemented in wireless system 1000.

The wireless devices or nodes 1050 may include any one of a number of wireless transmitting/receiving devices. For example, a satellite dish 1052 may be used to communicate with the Head End 1020 via the uplink and downlink channels. The satellite dish may, in turn, be connected to a local area network (LAN) 1030 which, may be further connected to one or more computer systems 1032. Another wireless device may be a portable/wireless computer system 1054, which is able to transmit and receive information to the Head End via uplink and downlink channels 1007 and 1009. Other wireless devices 1056 may include, for example, wireless telephones, handheld computing devices, etc.

In specific embodiments where the uplink and downlink channels within the wireless system 1000 are utilized in a manner similar to that of the upstream and downstream channels of a cable modem network, the above-described CNR measurement techniques may easily be implemented in wireless system 1000 using the detailed description of the present invention provided herein. Moreover, the technique of the present invention may be easily implemented in any computer network which uses shared access channels for communicating between a centralized computing system and one or more remote nodes.

It will be appreciated that the technique of the present invention is not limited to cable networks, and may be applied to any access data network which uses at least one shared access communication channel to communicate between a plurality of nodes in the network and a Head End of the network.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

It is claimed:

1. A method for determining a carrier-to-noise ratio (CNR) value for a selected channel of an access network, the access network including a plurality of network nodes which communicate with a Head End via at the selected channel, the method comprising:

measuring a background noise level on the selected channel during a first time interval when none of the network nodes are transmitting signals on the selected channel;

measuring a first carrier signal strength of a first network node on the selected channel during a second time interval when said first network node is transmitting at least one signal on the selected channel;

calculating a CNR value for the selected channel using the measured background noise level information and the measured first carrier signal strength information;

scheduling a first response request timeslot on the selected channel, said first response request timeslot specifying that no network device on the selected channel transmit signals during the first time interval; and scheduling a second response request timeslot on the selected channel, said second response request timeslot specifying that the first network device transmit the at least one signal on the selected channel during the second time interval.

2. The method of claim 1 wherein the calculation of the CNR value for the selected channel is not based upon an error vector magnitude value associated with the at least one signal.

3. The method of claim 1 wherein the calculation of the CNR value is based on a carrier signal transmitted by the first network node on the selected channel, and is not based on signals transmitted by other network nodes using the selected channel.

4. The method of claim 1 wherein said first carrier signal strength measuring includes measuring the first carrier signal strength of the first network node on the selected channel during the second time interval when only said first network node is transmitting at least one signal on the selected channel.

5. The method of claim 1 wherein the first response request timeslot specifies a network device identifier corresponding to a NULL network device on the selected channel; and wherein the second response request timeslot specifies a network device identifier corresponding to the first network device.

6. The method of claim 1 wherein said first and second response request timeslots are each scheduled to immediately follow a respective initial ranging timeslot scheduled on the selected channel.

7. The method of claim 6 further comprising scheduling an initial ranging timeslot about every two seconds.

8. The method of claim 1 further comprising:

measuring a second signal strength of a second network node on the selected channel during a third time interval when only the second network node is transmitting at least one second signal on the selected channel; and calculating a second CNR value for the selected channel using the measured background noise level information and the measured second signal strength information.

9. The method of claim 8 further comprising calculating an updated average CNR value for the selected channel using the measured background noise level information, the measured first carrier signal strength information, and the measured second signal strength information.

10. The method of claim 9 further comprising determining a respective CNR value for the selected channel using separate signals from each of the network nodes on the selected channel.

11. The method of claim 10 further comprising periodically re-computing the updated average CNR value for the selected channel using information relating to each of the respective CNR values.

12. The method of claim 1 wherein said access network is a cable network, said network nodes are cable modems, said selected channel corresponds to a selected upstream channel, and wherein the Head End comprises a Cable Modem Termination System (CMTS).

13. The method of claim 12 wherein the first and second response request timeslots correspond to station maintenance timeslots implemented according to a DOCSIS protocol.

14. The method of claim 12 wherein said first network node corresponds to a first cable modem, and wherein the calculation of the CNR value is based on signals transmitted by the first cable modem on the selected channel, and is not based on signals transmitted by other cable modems using the selected channel.

15. A method for determining a signal-to-noise ratio (SNR) value for a selected channel of an access network, the access network including a plurality of network nodes which communicate with a Head End via at the selected channel, the method comprising:

measuring a background noise level on the selected channel during a first time interval when none of the network nodes are transmitting signals on the selected channel;

measuring a first signal strength of a first network node on the selected channel during a second time interval when said first network node is transmitting at least one signal on the selected channel;

calculating a SNR value for the selected channel using the measured background noise level information and the measured first signal strength information;

scheduling a first response request timeslot on the selected channel, said first response request timeslot specifying that no network device on the selected channel transmit signals during the first time interval; and scheduling a second response request timeslot on the selected channel, said second response request timeslot specifying that the first network device transmit the at least one signal on the selected channel during the second time interval.

16. The method of claim 15 wherein the calculation of the SNR value for the selected channel is not based upon an error vector magnitude value associated with the at least one signal.

17. The method of claim 15 wherein the calculation of the SNR value is based on signals transmitted by the first network node on the selected channel, and is not based on signals transmitted by other network nodes using the selected channel.

18. The method of claim 15 wherein said first signal strength measuring includes measuring the first signal strength of the first network node on the selected channel during the second time interval when only said first network node is transmitting at least one signal on the selected channel.

19. A computer program product for determining a carrier-to-noise ratio (CNR) value for a selected channel of an access network, the access network including a plurality of network nodes which communicate with a Head End via at the selected channel, the computer program product comprising:
  a computer usable medium having computer code embodied therein, the computer readable code comprising:
    computer code for measuring a background noise level on the selected channel during a first time interval when none of the network nodes are transmitting signals on the selected channel;
    computer code for measuring a first signal strength of a first network node on the selected channel during a second time interval when said first network node is transmitting at least one signal on the selected channel;
    computer code for calculating a CNR value for the selected channel using the measured background noise level information and the measured first signal strength information;
    computer code for scheduling a first response request timeslot on the selected channel, said first response request timeslot specifying that no network device on the selected channel transmit signals during the first time interval; and
    computer code for scheduling a second response request timeslot on the selected channel, said second response request timeslot specifying that the first network device transmit the at least one signal on the selected channel during the second time interval.

20. The computer program product of claim 19 wherein said first signal strength measuring code includes computer code for measuring the first signal strength of the first network node on the selected channel during the second time interval when only said first network node is transmitting at least one signal on the selected channel.

21. The computer program product of claim 19 further comprising computer code for scheduling said first and second response request timeslots to immediately follow a respective initial ranging timeslot scheduled on the selected channel.

22. The computer program product of claim 19 further comprising:
  computer code for measuring a second signal strength of a second network node on the selected channel during a third time interval when only the second network node is transmitting at least one second signal on the selected channel; and
  computer code for calculating a second CNR value for the selected channel using the measured background noise level information and the measured second signal strength information.

23. The computer program product of claim 22 further computer code for comprising calculating an updated average CNR value for the selected channel using the measured background noise level information, the measured first signal strength information, and the measured second signal strength information.

24. The computer program product of claim 23 further comprising computer code for determining a respective CNR value for the selected channel using separate signals from each of the network nodes on the selected channel.

25. The computer program product of claim 24 further comprising computer code for periodically re-computing the updated average CNR value for the selected channel using information relating to each of the respective CNR values.

26. The computer program product of claim 19 wherein said access network is a cable network, said network nodes are cable modems, said selected channel corresponds to a selected upstream channel, and wherein the Head End comprises a Cable Modem Termination System (CMTS).

27. A system for determining a carrier-to-noise ratio (CNR) value for a selected channel of an access network, the access network including a plurality of network nodes, the system comprising:
  a Head End in communication with at least a portion of the network nodes, the Head End comprising:
    at least one CPU;
    memory;
    at least one interface configured or designed to receive signals from at least one network node via the selected channel; and
    at least one analog-to-digital (A/D) converter configured or designed to analyze signals on the selected channel;
  the Head End being configured or designed to measure a background noise level on the selected channel during a first time interval when none of the network nodes are transmitting signals on the selected channel;
  the Head End being further configured or designed to measure a first signal strength of a first network node on the selected channel during a second time interval when said first network node is transmitting at least one signal on the selected channel;
  wherein the Head End is further configured or designed to calculate a CNR value for the selected channel using the measured background noise level information and the measured first signal strength information;
  wherein the Head End is further configured or designed to schedule a first response request timeslot on the selected channel, said first response request timeslot specifying that no network device on the selected channel transmit signals during the first time interval; and
  wherein the Head End is further configured or designed to schedule a second response request timeslot on the selected channel, said second response request timeslot specifying that the first network device transmit the at least one signal on the selected channel during the second time interval.

28. The system of claim 27 wherein said first signal corresponds to a first carrier signal on the selected channel.

29. The system of claim 27 wherein the calculation of the CNR value for the selected channel is not based upon an error vector magnitude value associated with the at least one signal.

30. The system of claim 27 wherein the Head End is further configured or designed to reserve use of the second response request timeslot exclusively for the first network node.

31. The system of claim 30 wherein the Head End is further configured or designed instruct each of the portion of network nodes to not transmit signals on the selected channel during the first time interval.

32. The system of claim 27 wherein said first and second response request timeslots are each scheduled to immediately follow a respective initial ranging timeslot scheduled on the selected channel.

33. The system of claim 27:

wherein the Head End is further configured or designed to measure a second signal strength of a second network node on the selected channel during a third time interval when only the second network node is transmitting at least one second signal on the selected channel; and wherein the Head End is further configured or designed to calculate a second CNR value for the selected channel using the measured background noise level information and the measured second signal strength information.

34. The system of claim 33 wherein the Head End is further configured or designed to calculate an updated average CNR value for the selected channel using the measured background noise level information, the measured first signal strength information, and the measured second signal strength information.

35. The system of claim 27 wherein said access network is a cable network, said network nodes are cable modems, said selected channel corresponds to a selected upstream channel, and wherein the Head End comprises a Cable Modem Termination System (CMTS).

36. The system of claim 35 wherein the first and second response request timeslots correspond to station maintenance timeslots implemented according to a DOCSIS protocol.

37. A system for determining a carrier-to-noise ratio (CNR) value for a selected channel of an access network, the access network including a plurality of network nodes which communicate with a Head End via at the selected channel, the system comprising:

means for measuring a background noise level on the selected channel during a first time interval when none of the network nodes are transmitting signals on the selected channel;

means for measuring a first signal strength of a first network node on the selected channel during a second time interval when said first network node is transmitting at least one signal on the selected channel;

means for calculating a CNR value for the selected channel using the measured background noise level information and the measured first signal strength information;

means for scheduling a first response request timeslot on the selected channel, said first response request timeslot specifying that no network device on the selected channel transmit signals during the first time interval; and means for scheduling a second response request timeslot on the selected channel, said second response request timeslot specifying that the first network device transmit the at least one signal on the selected channel during the second time interval.

* * * * *